United States Patent
Lauri et al.

(10) Patent No.: US 7,077,024 B2
(45) Date of Patent: Jul. 18, 2006

(54) PROCEDURE FOR UPSHIFTING GEAR IN A MOTOR VEHICLE AND A POWER PLANT UNIT FOR A MOTOR VEHICLE

(75) Inventors: Erik Lauri, Västra Frölunda (SE); Svante Karlsson, Västra Frölunda (SE); Marcus Steen, Angered (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/904,589

(22) Filed: Nov. 17, 2004

(65) Prior Publication Data
US 2005/0166693 A1 Aug. 4, 2005

Related U.S. Application Data

(63) Continuation of application No. PCT/SE03/00734, filed on May 7, 2003, now abandoned.

(30) Foreign Application Priority Data
May 17, 2002 (SE) .................................. 0201498

(51) Int. Cl.
*F16H 3/08* (2006.01)
(52) U.S. Cl. ............................. 74/325; 74/331; 74/329
(58) Field of Classification Search ................... 74/325, 74/331, 335, 329
See application file for complete search history.

(56) References Cited

U.S. PATENT DOCUMENTS

| | | | | |
|---|---|---|---|---|
| 3,248,962 A | * | 5/1966 | McNamara et al. | 74/339 |
| 3,478,851 A | * | 11/1969 | Smyth et al. | 192/3.55 |
| 4,614,126 A | * | 9/1986 | Edelen et al. | 74/333 |
| 5,086,659 A | * | 2/1992 | Earp | 74/411.5 |
| 5,409,432 A | | 4/1995 | Steeby | |
| 5,593,363 A | * | 1/1997 | Asai et al. | 477/74 |
| 5,830,104 A | | 11/1998 | Desautels et al. | |
| 6,017,291 A | | 1/2000 | Ailes et al. | |
| 6,080,081 A | * | 6/2000 | Sauermann et al. | 477/79 |
| 6,536,569 B1 | * | 3/2003 | Nishimura | 192/3.58 |
| 6,634,983 B1 | * | 10/2003 | Nishimura | 477/85 |

FOREIGN PATENT DOCUMENTS

| | | |
|---|---|---|
| EP | 0670440 A1 | 9/1995 |
| SE | 502154 C2 | 9/1995 |
| SE | 521245 C2 | 10/2003 |
| WO | WO 0192049 A1 | 12/2001 |

* cited by examiner

*Primary Examiner*—Tisha Lewis
(74) *Attorney, Agent, or Firm*—Novak Druce & Quigg, LLP

(57) ABSTRACT

Method and arrangement for gear upshifting in a motor vehicle. The arrangement includes an internal combustion engine (1) with an engine-braking device (52), an automated disk-clutch (3), a multi-stage gearbox (9), in the casing (8) of which an input shaft (7), an intermediate shaft (11) and a main shaft (10) are mounted, and an intermediate shaft brake (50) for braking the intermediate shaft (11). When the upshifting takes place, the disk clutch (3) is disengaged and the intermediate shaft (11) is disengaged from the main shaft (10). The intermediate shaft brake (50) is activated so that the rotational speed of the intermediate shaft (11) is adapted to the next gear selected at the same time as the rotational speed of the engine (1) is adapted to the rotational speed of the input shaft (7) in the new gear by virtue of the engine-braking device (52) being activated.

7 Claims, 2 Drawing Sheets

"Engine Torque and Speed Phases During Upshifting."

PROCEDURE FOR UPSHIFTING GEAR IN A MOTOR VEHICLE AND A POWER PLANT UNIT FOR A MOTOR VEHICLE

CROSS-REFERENCE TO RELATED APPLICATIONS

The present application is a continuation patent application of International Application No. PCT/SE03/00734 filed 7 May 2003 now abandoned which was published in English pursuant to Article 21(2) of the Patent Cooperation Treaty, and which claims priority to Swedish Application No. 0201498-3 filed 17 May 2002. Said applications are expressly incorporated herein by reference in their entireties.

FIELD OF THE INVENTION

The present invention relates to a procedure for upshifting gear in a motor vehicle. The method and arrangement for implementing the invention includes an internal combustion engine with an engine-braking device, an automated disk-clutch and a multi-stage gearbox with braking means for braking an intermediate shaft arranged in the gearbox.

BACKGROUND OF THE INVENTION

In the instant application, the power plant comprises (includes, but is not necessarily limited to) an internal combustion engine, a disk clutch and gearbox of the vehicle, and a drive line including the engine, the gearbox and drive (driving) wheels.

Automatic gearboxes of the automated multi-stage gearbox type have become increasingly common in heavy-duty vehicles as microcomputer technology further develops making it possible, with a control computer and a number of actuators such as servo motors, to precision-regulate engine speed, engagement and disengagement of an automated disk-clutch between the engine and the gearbox and also the coupling means of the gearbox in relation to one another so that soft shifting is always obtained at the correct engine speed. Among others, advantages of this type of automatic gearbox (compared to a conventional automatic gearbox that is constructed with planetary gear stages and with a hydrodynamic torque converter on the input side) include: (1) the arrangement is more simple and robust, particularly with respect to heavy-duty vehicles, and can be manufactured at a considerably lower cost than a conventional automatic gearbox, and (2) the arrangement and method have higher than conventional efficiency which means lower fuel consumption is possible.

A multi-stage gearbox is usually made up of an input shaft, an intermediate shaft, which has at least one gearwheel in engagement with a gearwheel on the input shaft, and a main shaft with gearwheels which engage with gearwheels on the intermediate shaft. The main shaft is also connected to an output shaft coupled to the driving wheels via, for example, a drive shaft.

Each pair of gearwheels has a different ratio compared with another pair of gearwheels in the gearbox.

Different gears are obtained by virtue of different pairs of gearwheels transmitting the torque from the engine to the driving wheels. Each gear is usually synchronized, but variants exist where at least some gears are unsynchronized. Speed adaptation must then be effected in another way and with great precision, for example by means of an intermediate shaft brake (speed reduction of the intermediate shaft) or control of the engine speed (speed increase/reduction). An intermediate shaft brake adapts the speed of the intermediate shaft relatively rapidly to the new lower ratio to be selected; that is to say, intermediate shaft braking takes place during upshifting.

Electronic control systems for the engine of a vehicle have also been affected by the development of computer technology and have become more accurate, more rapid and more adaptable to prevailing states of the engine and the surrounding environment. The entire combustion process can be precision-controlled according to each operating situation. The speed of the engine can therefore be controlled accurately. An engine can also be equipped with an engine-braking device to be used primarily as an auxiliary brake. Auxiliary brakes are used chiefly in heavy-duty vehicles with the major purpose of sparing the service brakes of the vehicle, in particular on long downhill gradients when it is desirable to brake in order to maintain a reasonably constant speed.

The term engine-braking device includes several different types of engine brakes. Examples of engine brakes are compression brakes, exhaust brakes (valve in the exhaust pipe), electric motor/generator coupled to, for example, the output shaft of the internal combustion engine which is also referred to as an Integrated Starter Alternator.

In addition to using the engine-braking device for braking the vehicle itself, that is to say as a supplement to the wheel brakes of the vehicle, it is known to use the engine-braking device, for example a compression brake, during shifting in vehicles with a multi-stage (usually automated) gearbox. By braking the rotation of the engine by means of the engine-braking device, more rapid speed adaptation from a high speed to a lower speed can be effected. FIG. 1 shows the fundamental phases in connection with upshifting, that is to say shifting to a higher gear with a lower ratio.

FIG. 1 shows a comparison between engine torque and the rotational speed of the engine in relation to time for a given engine type.

According to FIG. 1, phase "a" indicates a normal driving state which exists before shifting is initiated. Phase "b" shows the removal of engine torque as soon as it has been determined that upshifting is to take place; that is to say, a claw coupling (coupling sleeve) engaged for the existing gear becomes torqueless. Phase "c" shows disengagement of the claw coupling. Phase "d" shows a reduction of the rotational speed of the engine in order to adapt the rotational speed of the engine to the new gear ratio to be selected. As soon as the rotational speed of the engine has been adapted, it is possible to begin driving the vehicle with the new gear. Phase "e" therefore shows the engagement of the new claw coupling belonging to the new gear selected. Phase "f" shows the restoration of engine torque, and phase "g" shows a normal driving state after upshifting has taken place. Note that the disk clutch between the engine and the gearbox is not disengaged during upshifting but the crankshaft of the engine is coupled together with the intermediate shaft so that the engine-braking device adapts the speed of both the engine and the intermediate shaft. Relatively accurate speed adaptation is therefore necessary in order that upshifting does not feel uncomfortable. The accuracy of the speed adaptation is even more important when shifting to unsynchronized gears.

In order to shorten the discontinuation of driving power of the vehicle during upshifting, it is an advantage if the speed of the engine can be adapted to the new gear as soon as possible. This is particularly advantageous on uphill gradients when the vehicle loses more speed when driving power is discontinued, and therefore quick upshifting is required.

SE 502154 discloses an exhaust brake that is selectively actuated during upshifting when certain operational parameters are reached so as to bring about rapid reduction of the engine speed during the upshifting procedure. In this way, it is said that the wear on the exhaust-braking system is reduced because the exhaust brake is introduced during only a small proportion of the total number of upshifts.

An arrangement for engine-braking in connection with an internal combustion engine is previously known from SE 9804439-9. This arrangement is adapted for engine-braking by reduction of the speed of the engine during upshifting and to this end comprises a special device sensitive to a signal generated in response to a need to bring about shifting, and in order to bring about take-up of a valve clearance in a rocker arm.

An automated disk-clutch as described above (that is to say, arranged between the engine and the gearbox) is usually regulated by means of information about the position of the throttle lever, the rotational speed of the engine, the outgoing torque of the engine and the position of the disk clutch. The controlling parameter for the position of the clutch and thus the degree of engagement between the engine and the gearbox is chiefly how the driver (alternatively a cruise control arrangement) positions the throttle lever.

One disadvantage of using engine-braking devices in order to adapt speed during upshifting is that the internal combustion engine has to be brought into a relatively narrow speed range (for example from 1600 to 1200, plus or minus 50 rpm) in order to make possible comfortable engagement of the new gear. After the speed adaptation of the engine has been carried out, the gear-engagement servo itself requires a certain reaction time before the engine can begin to deliver positive driving torque to the input shaft of the gearbox. Moreover, idle times in the engine-braking function itself can mean that it is necessary to include a safety margin when driving the vehicle uphill, which makes the average speed of the vehicle worse.

The disadvantage of using an intermediate shaft brake during upshifting is that the speed of the internal combustion engine and the speed of the input shaft of the gearbox are not synchronous when the intermediate shaft brake has carried out the speed synchronization for the new gear and the new gear has been engaged. It is then necessary afterwards to use the disk clutch between the engine and the gearbox in order to synchronize the speed difference between the engine and the input shaft of the gearbox. If this synchronization does not take place relatively slowly, too great a positive torque is obtained in the drive line, which would otherwise, if synchronization were too rapid, lead to the vehicle jerking and the drive line being subjected to unnecessary stresses. Moreover, on account of the jerks, the comfort in the vehicle is reduced.

Long shifting stages (large speed difference between engine and input shaft) therefore tend to take a long time.

There is therefore a need in vehicles equipped with multi-stage gearboxes to find an upshifting solution which can perform speed adaptation for a new gear selected in a more rapid but still comfortable way.

SUMMARY OF THE INVENTION

One embodiment of the present invention concerns a procedure for upshifting in a motor vehicle. The invention includes an internal combustion engine with an engine-braking device, an automated disk-clutch, a multi-stage gearbox, in the casing of which an input shaft, an intermediate shaft and a main shaft are mounted, and braking means for braking the intermediate shaft, and where, when the upshifting takes place, the disk clutch is disengaged and the intermediate shaft is disengaged from the main shaft. Another embodiment of the invention takes the form of a method in which a braking means is activated so that the rotational speed of the intermediate shaft is adapted to the next gear selected at the same time as the rotational speed of the engine is adapted to the rotational speed of the input shaft in the new gear by virtue of the engine-braking device being activated.

According to one embodiment, the invention takes the form of a power plant for a motor vehicle comprising an internal combustion engine with an engine-braking device, an automated disk-clutch, a multi-stage gearbox which has at least one intermediate shaft that is mounted in a casing and has at least one gearwheel in engagement with a gearwheel on an input shaft mounted in the casing. A braking means is provided and with which the rotation of the intermediate shaft can be braked rapidly when disengagement of the disk clutch takes place, a main shaft, mounted in the casing, with gearwheels which engage with gearwheels on the intermediate shaft, at least one gearwheel in each pair of intermeshing gearwheels on the intermediate shaft and the main shaft being mounted rotatably on its shaft and lockable by coupling means, of which at least the coupling means for some forward gears lack a synchronizing function. The disk clutch is arranged to transmit driving power from the output shaft of the engine to the input shaft of the gearbox, a control unit with at least an engine control function, a control function for the engine-braking device and a disk-clutch control function, into which control unit signals are fed representing gear selected and various engine and vehicle data comprising at least engine speed, speed of the input shaft and output shaft of the gearbox and clutch position, and where the control unit is arranged so as where, when the upshifting takes place, the disk clutch is disengaged and the intermediate shaft is disengaged from the main shaft. The power plant is characterized in that the control unit also has a control function for the braking means and in that the control unit is arranged so as, when the upshifting takes place, to activate the braking means so that the rotational speed of the intermediate shaft is adapted to the next gear selected and at the same time to activate the engine-braking device in order to adapt the rotational speed of the engine to the rotational speed of the input shaft.

The advantage of the procedure and the device according to the invention is that upshifting is carried out more rapidly and with retained comfort compared with the known art. A shorter shifting time is obtained for upshifts between different gears and at different rotational speeds. The time-saving varies depending on conditions.

In an embodiment of the procedure (process or method) and the device according to the invention, re-engagement of the disk clutch takes place when the engine has a rotational speed which is slightly higher than the speed of the input shaft of the gearbox.

Compared with known engine-braking devices, a positive drive-line torque is obtained more rapidly; that is to say, the engine begins to drive the vehicle sooner by virtue of the fact that the drive line already receives a driving torque at (continuing with the example indicated above) the engine speed 1300 rpm instead of at 1200 rpm. The speed of the engine does not have to be reduced as much, which results in a shorter time for the discontinuation of driving power from the engine. Moreover, the reaction time in the gear-engagement servo is eliminated. Furthermore, it is not necessary to have a safety margin when driving uphill. The invention means that use is made of a little of the surplus motive energy of the engine to provide drive line torque instead of braking away the energy in the engine-braking device.

Compared with using only a gearbox brake, longer gear stages are possible by virtue of the invention without the shifting time becoming appreciably longer, because the engine speed is relatively synchronous compared with the speed of the input shaft at the start of the work of re-engagement of the disk clutch. This is owing to the use of the engine-braking device. By controlling the engine-braking device, it is also possible to select an optimum engine speed level at the start of re-engagement of the disk clutch. The selection of optimum engine speed level depends on the selection of shifting rapidity, shifting comfort and clutch wear.

Assume also that the vehicle does not lose speed during upshifting, and that the product of the new gear selected and the speed of the output shaft is, to follow the earlier speed example, a constant 1200 rpm during upshifting. The same argument can be used if the vehicle loses speed or increases speed during shifting, but it is then necessary to take the speed change into account in the control of the engine-braking device and the gearbox brake. It takes time to reduce the speed of an engine down as far as 1200 rpm. By means of the invention, it is possible that it is only necessary to reduce the engine speed to, for example, 1300 rpm before it is possible to affect drive in the drive line again (positive drive-line torque). This contributes to the shorter driving power interruption time; that is to say, the time for upshifting. The reason the engine speed does not have to be reduced as far as 1200 rpm is that the disk clutch between the engine and the gearbox is not as sensitive to speed differences as in particular a gear with an unsynchronized claw coupling (unsynchronized gear). When shifting takes place, such a synchronizing device, compared with a disk clutch, synchronizes the speeds of the shafts immediately; that is to say, the speed adaptation takes place in a very short time. On the other hand, a disk clutch allows more slip. Therefore, if an unsynchronized gear is engaged already at an engine speed (according to the earlier example) of 1300 rpm, the result is a jerk and an uncomfortable shift. On the other hand, if the disk clutch is applied at the same engine speed of 1300 rpm, a more balanced slip and a softer torque progress in the drive line are obtained, which results in a comfortable shift.

BRIEF DESCRIPTION OF THE DRAWINGS

The present invention is described in detail below with reference to the accompanying drawings, which show by way of example further preferred embodiments of the invention and include.

DESCRIPTION OF PREFERRED
EMBODIMENTS OF THE INVENTION

Figure 1:
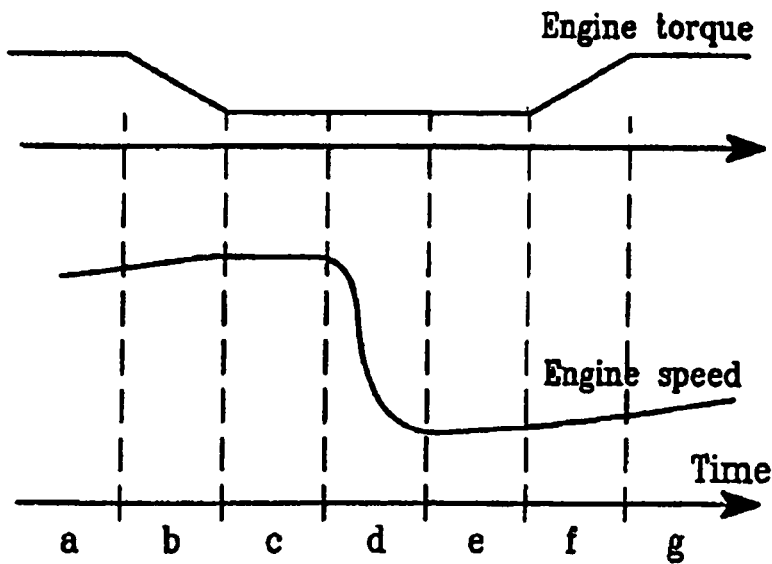
FIG. 1 is a graphical representation showing the fundamental phases during a gear upshift depicting a comparison between engine torque and rotational speed of the engine in relation to time.
Figure 2:
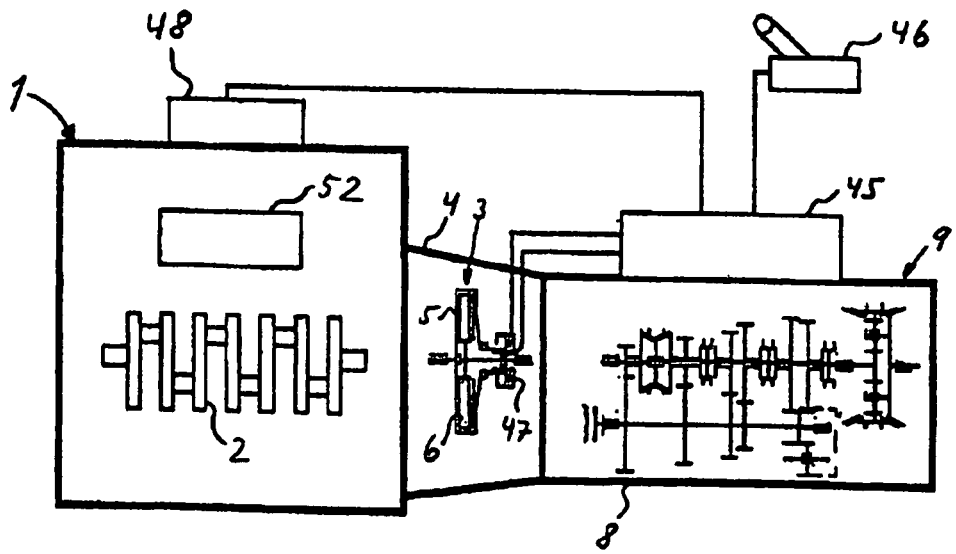
FIG. 2 is a schematic representation of a power plant in principle.

In FIG. 2, reference number 1 designates a six-cylinder internal combustion engine, for example a diesel engine, the crankshaft 2 of which is coupled to a single-plate dry disk clutch, designated generally by reference number 3, and which is enclosed in a clutch case 4. A two-plate version can be used instead of a single-plate disk clutch. The crankshaft 2 is, via the output shaft 51 of the engine (see FIG. 3), connected non-rotatably to the clutch housing 5 of the clutch 3, while a plate 6 thereof is non-rotatably connected to an input shaft 7 mounted rotatably in the casing 8 of a gearbox designated generally by reference number 9. A main shaft 10 and an intermediate shaft 11 are also rotatably mounted in the casing 8. Also illustrated are an engine control unit 48, a transmission control unit 45 and a manual gear selector 46 coupled to the transmission control unit 45. The transmission control unit 45 and the engine control unit 48 are adapted for communication with one another.

Figure 3:
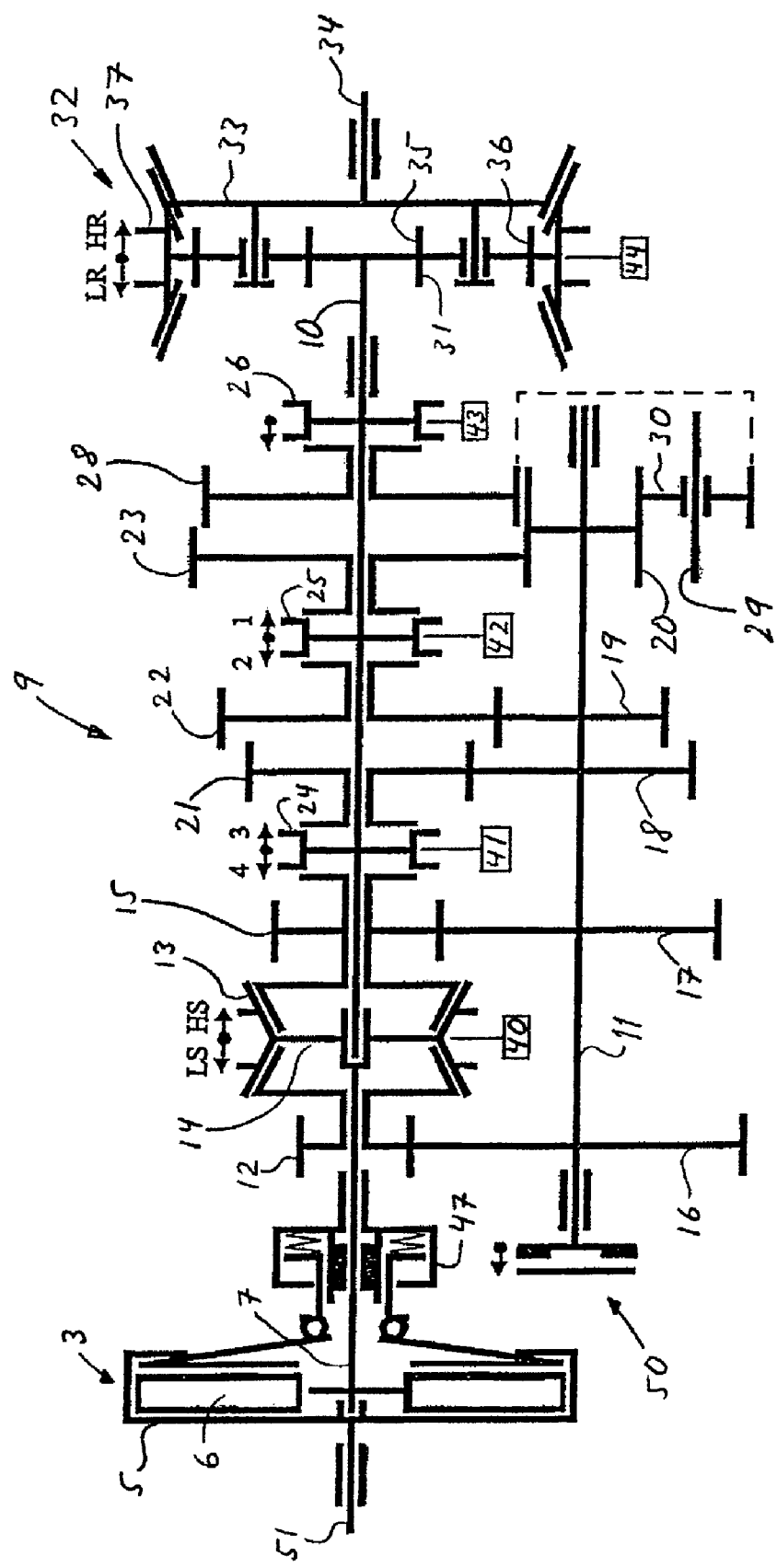
FIG. 3 is a diagrammatic representation showing a disk clutch and gearbox for the arrangement shown in FIG. 2, but on an enlarged scale.

As can be seen most clearly in FIG. 3, a gearwheel 12 is mounted rotatably on the input shaft 7 and is lockable on the shaft by means of a coupling sleeve 13 which is provided with synchronizing means and is mounted non-rotatably, but axially displaceably on a hub 14 connected non-rotatably to the input shaft. By means of the coupling sleeve 13, a gearwheel 15 mounted rotatably on the main shaft 10 is also lockable relative to the input shaft 7. The coupling sleeve 13 and the hub 14 are, for each gear, provided with a claw coupling (not shown) for locking the gearwheel 12, 15 concerned in relation to the shaft 7. With the coupling sleeve 13 in a central position, both the gearwheels 12 and 15 are disengaged from their shafts 7 and 10, respectively. The gearwheels 12 and 15 engage with gearwheels 16 and, respectively, 17 which are connected non-rotatably to the intermediate shaft 11. Arranged in a rotationally fixed manner on the intermediate shaft 11 are further gearwheels 18, 19 and 20 which engage with gearwheels 21, 22 and 23, respectively, which are mounted rotatably on the main shaft 10 and are lockable on the main shaft by means of coupling sleeves 24, 25, respectively, and which, in the illustrative embodiment shown, do not have synchronizing devices. A further gearwheel 28 is mounted rotatably on the main shaft 10 and engages with an intermediate gearwheel 30 which is mounted rotatably on a separate shaft 29 and in turn engages with the intermediate shaft gearwheel 20. The gearwheel 28 is lockable on its shaft by means of a coupling sleeve 26. Corresponding claw couplings (not shown) are present for all the gears.

The gearwheel pairs 12, 16 and 15, 17 and the coupling sleeve 13 form a split gearing with a low gear stage LS and a high gear stage HS. The gearwheel pair 15, 17 also forms, together with the gearwheel pairs 21, 18, 22, 19, 23, 20 28, and 30, a basic gearbox with four forward gears and one reverse gear. Arranged in a rotationally fixed manner on the output end of the main shaft is a gearwheel 31 which forms the sun gear 1 in a two-stage range gear of planetary type which is designated by reference number 32 and the planet-wheel carrier 33 of which is connected in a rotationally fixed manner to a shaft 34 which forms the output shaft of the gearbox. The planet wheels 35 of the range gear 32 engage with a ring gear 36 which, by means of a coupling sleeve 37, is lockable relative to the gearbox casing 8 for low range LR and relative to the planet-wheel carrier 33 for high range HR.

The coupling sleeves 13, 24, 25, 26 and 37 are displaceable as shown by the arrows in FIG. 3 where the gear stages are shown in conjunction with the arrows.

The displacement is brought about by servo devices 40, 41, 42, 43 and 44 indicated diagrammatically in FIG. 3, which can be pneumatically operated piston/cylinder arrangements of the type used in a gearbox of the type described above, which is marketed under the tradename, GEARTRONIC.

The servo devices 40, 41, 42, 43 and 44 are controlled by a transmission control unit 45 (see FIG. 2), comprising a microcomputer, depending on signals fed into the control unit representing various engine and vehicle data comprising at least engine speed, vehicle speed, throttle pedal position and, where appropriate, engine-braking device on/off, when an electronic gear selector 46 coupled to the control unit 45 is in its automatic transmission position. When the selector is in the position for manual shifting, shifting takes place at the command of the driver via the gear selector 46.

The control unit 45 also controls the fuel injection; that is to say, the engine speed, depending on the throttle pedal position and also the air supply to a pneumatic piston/cylinder arrangement 47 by means of which the disk clutch 3 is disengaged or engaged.

The position of the automated clutch 3 is regulated during shifting by the control unit 45 by means of information about the position of the throttle lever 48, engine speed, engine torque and the position of the clutch 3 so that soft shifting takes place.

According to the invention, the engine 1 is equipped with some type of engine-braking device. In a preferred embodiment of the invention, the engine-braking device is a compression brake 52. It is also possible within the scope of the inventive idea to use other types of engine-braking devices. During upshifting, the compression brake 52 is controlled by the transmission control unit 45 via the engine control unit 48.

According to the invention, the gearbox 9 is equipped with an intermediate shaft brake 50. The intermediate shaft brake 50 usually consists of a disk clutch (shown only diagrammatically), the braking force of which is controlled by virtue of a hydraulic piston (not shown) pressing the disk clutch together with variable force.

The pressure of the piston, and thus the braking force of the intermediate shaft brake, is regulated by the transmission control unit 45. Other types of intermediate shaft brake are also possible, such as, for example, various types of disk brakes.

Upshifting according to the invention can be initiated by the driver of the vehicle or by the automatic system depending on a gear selection strategy stored in the transmission control unit 45. Assume, for example, that the low gear stage LS and the low range position are engaged and an upshift from first gear to third gear is initiated. The transmission control unit 45 then first controls the engine control unit 48 so as to regulate the fuel supply to the engine 1 so that a torqueless or virtually torqueless state is created in the drive line of the vehicle; that is to say, the torque transmission from the crankshaft 2 of the engine 1 to the input shaft 7 of the gearbox 9 will be virtually zero. When the torque on the input shaft 7 is virtually zero, the transmission control unit 45 disengages the disk clutch 3. After the disk clutch 3 has been disengaged, first gear is disengaged; that is to say, the coupling sleeve 25 is moved into central position.

The gearwheel 23 of the first gear is therefore disengaged from the main shaft 10, and the intermediate shaft 111 is thus also disengaged from the main shaft 10. When the transmission control unit 45 has registered that the disk clutch 3 and the intermediate shaft 11 are disengaged, the transmission control unit 45 gives a signal that the engine-braking device 52 is to begin reducing the engine speed to a speed just above the speed for third gear and a signal that the intermediate shaft brake is to begin to reduce the speed of the intermediate shaft 11 so that the speed of the intermediate shaft 11 is synchronous with the speed of the main shaft 10 for third gear. Speed sensors (not shown) measure the rotational speed of the crankshaft 2 of the engine, the intermediate shaft 11 and the main shaft 10. As soon as the transmission control system 45 registers, by means of the speed sensors, that the correct speed of the intermediate shaft 11 has been reached, the transmission control system 45 gives a signal so that the servo device 41 changes the position of the coupling sleeve 24 and the gearwheel 21 is locked in relation to the main shaft 10 and third gear is engaged. By virtue of the fact that the input shaft 7 is coupled together with the intermediate shaft 11 throughout upshifting by the gearwheels 12 and 16, the input shaft 7 is braked to the same degree as the intermediate shaft. In order to save time, the speed of the engine 1 is not reduced all the way down to the new speed of the input shaft 7 but, according to the invention, to just above the new speed of the input shaft. When the engine 1 has reached the desired speed, the transmission control unit 45 engages the disk clutch 3 with a little slip so that the last speed difference is synchronized. As the speed of the engine 1 is slightly higher than that of the input shaft 7, a small positive torque, that is to say driving torque, is obtained in the drive line. Use is therefore made of part of the motive energy that the engine 1 still has, on account of the speed difference between first and third gear, to drive the vehicle forward. What takes most time during upshifting is engine speed reduction. Speed reduction of the intermediate shaft 11 goes more rapidly because this involves a smaller mass in relation to the possible available braking effect from the intermediate shaft brake 50. The intermediate shaft 11 therefore normally reaches the new desired speed sooner than the engine does.

By virtue of the fact that, according to the invention, the speed reduction of the engine 1 and the intermediate shaft 11 takes place in parallel, and also by virtue of the fact that the engine speed is not reduced down as far as the speed of the input shaft, a shorter engine-braking time is obtained than according to the known art where only an engine-braking device is used during upshifting. The selection of the speed when the engine is to be engaged depends on the selection of shifting rapidity, shifting comfort and clutch wear.

The upshifting procedure and the device according to the invention are applicable in all upshifts which comprise unsynchronized shifting in the gearbox 9.

The upshifting according to the invention could take place without fuel supply, for example when driving downhill. The invention is of most use, however, on an uphill gradient when the time for upshifting according to the known art is not short enough. It is possible to introduce a selective function into the control units so that the function according to the invention is, for example, engaged only during upshifting when the driving resistance of the vehicle exceeds a certain value.

The invention contemplates that the functions of the invention can be carried out by one, two or more control units.

The gear position sensor can be a sensor arranged directly in the gearbox or it can be indirect; that is to say, the gear engaged is determined by means of the relationship between the rotational speed on the respective output shafts of the engine 1 and the gearbox 9.

What is claimed is:

1. A method for gear upshifting in a motor vehicle that includes an internal combustion engine (1) with an engine-braking device (52), an automated disk-clutch (3), a multi-stage gearbox (9), in the casing (8) of which an input shaft (7), an intermediate shaft (11) and a main shaft (10) are mounted, and braking means (50) for braking the intermediate shaft (11), upon upshifting, the disk clutch (3) is disengaged and the intermediate shaft (11) is disengaged from the main shaft (10) and the braking means (50) is activated so that rotational speed of the intermediate shaft (11) is adapted to a new gear selected at the same time as the rotational speed of the engine (1) is adapted to the rotational speed of the input shaft (7) in the new gear by virtue of the engine-braking device (52) being activated.

2. The method as recited in claim 1, further comprising the intermediate shaft (11) being coupled to the main shaft (10) again with the new gear and the disk clutch (3) reengaged.

3. The method as recited in claim 2, further comprising the reengagement of the disk clutch (3) taking place when the engine (1) has a rotational speed that is slightly higher than the speed of the input shaft (7).

4. A power plant for a motor vehicle, comprising an internal combustion engine (1) with an engine-braking device (52), an output shaft (51) of the engine an automated disk-clutch (3), a multi-stage gearbox (9) which has at least one intermediate shaft (11) mounted in a casing (8) and has at least one gearwheel (16, 17) in engagement with a gearwheel (12, 15) on an input shaft (7) mounted in the casing (8) and braking means (50) with which the rotation of the intermediate shaft (11) can be braked rapidly when disengagement of the disk clutch (3) takes place, a main shaft (10), mounted in the casing, with gearwheels (21, 22, 23) which engage with gearwheels (18, 19, 20) on the intermediate shaft (11), at least one gearwheel in each pair of intermeshing gearwheels on the intermediate shaft (11) and the main shaft (10) being mounted rotatably on its shaft and lockable by coupling means (24,25), of which at least the coupling means for some forward gears lack a synchronizing function, and the disk clutch (3) is arranged to transmit driving power from the output shaft (51) of the engine (1) to the input shaft (7) of the gearbox, a control unit (48,45) with at least an engine control function, a control function for the engine-braking device (52) and a disk-clutch control function, into which control unit (48,45) signals are fed representing gear selected and various engine and vehicle data comprising at least engine speed, speed of the input shaft and output shaft (7) of the gearbox and disk clutch position, and where the control unit (45) is arranged so as, when upshifting takes place, to disengage the disk clutch (3) and to disengage the intermediate shaft (11) from the main shaft (10), characterized in that the control unit (45) also has a control function for said braking means (50) and in that the control unit (45) is arranged so as, when the upshifting takes place, to activate the braking means (50) so that the rotational speed of the intermediate shaft (11) is adapted to the next gear selected and at the same time to activate the engine-braking device (52) in order to adapt the rotational speed of the engine (1) to the rotational speed of the input shaft (7).

5. The power plant as recited in claim 4, wherein the engine-braking device is a compression brake (52).

6. The power plant as recited in claim 4, wherein the control unit (45) is arranged to bring about re-engagement of the disk clutch (3) at an engine speed which is slightly higher than the speed of the input shaft (7) in the new gear selected.

7. The power plant as recited in claim 6, wherein the engine-braking device is a compression brake (52).

* * * * *